United States Patent
Jensen

(10) Patent No.: US 10,401,166 B2
(45) Date of Patent: Sep. 3, 2019

(54) STAND-ALONE REMOTE REAL-TIME ALTITUDE READOUT METHOD AND SYSTEM FOR SMALL UAVS

(71) Applicant: RUMFERT, LLC, Omaha, NE (US)

(72) Inventor: David Dale Jensen, Omaha, NE (US)

(73) Assignee: RUMFERT, LLC, Omaha, NE (US)

( * ) Notice: Subject to any disclaimer, the term of this patent is extended or adjusted under 35 U.S.C. 154(b) by 169 days.

(21) Appl. No.: 15/622,028

(22) Filed: Jun. 13, 2017

(65) Prior Publication Data

US 2018/0356217 A1    Dec. 13, 2018

(51) Int. Cl.
  *G01C 5/00* (2006.01)
  *B64C 39/02* (2006.01)
  *G01C 23/00* (2006.01)

(52) U.S. Cl.
  CPC ............ *G01C 5/005* (2013.01); *B64C 39/024* (2013.01); *G01C 23/005* (2013.01)

(58) Field of Classification Search
  CPC ...................................................... G01C 5/005
  See application file for complete search history.

(56) References Cited

U.S. PATENT DOCUMENTS

| | | | |
|---|---|---|---|
| 8,903,568 B1 | 12/2014 | Wang et al. | |
| 8,924,069 B1 * | 12/2014 | Kaneshige | G05D 1/12 701/27 |
| 9,008,869 B2 | 4/2015 | Allen et al. | |
| 9,028,312 B1 * | 5/2015 | Wei | A63F 13/02 463/2 |
| 9,545,995 B1 * | 1/2017 | Chau | B64C 13/06 |
| 9,650,155 B2 | 5/2017 | Wang et al. | |
| 9,652,904 B2 | 5/2017 | Shi et al. | |
| 9,663,227 B1 | 5/2017 | Lema et al. | |
| 9,696,725 B2 * | 7/2017 | Wang | G05D 1/0669 |
| 2006/0138277 A1 * | 6/2006 | Franceschini | G05D 1/0646 244/17.13 |

(Continued)

OTHER PUBLICATIONS

Eagle Tree Systems, LLC Seagull Wireless Dashboard Flight System Web site: http://www.eagletreesystems.com/index.php?route=product/product&path=63_70&product_id=90 Manual: http://www.eagletreesystems.com/Manuals/Pro,%20Glide,%20Flight%20and%20Boat%20Seagull%20and%20Data%20Recorder%20Instruction%20Manual.pdf.

(Continued)

*Primary Examiner* — Alex C Dunn

(57) ABSTRACT

The invention comprises an apparatus and method for real-time readout of a recreational drone or UAV altitude. The invention includes an airborne sensor/transmitter unit and a ground based receiver/display unit. The airborne unit is removably attached to the flying vehicle and carried aloft. The ground based receiver/display unit is associated with the ground based operator (pilot) of the UAV. The airborne unit comprises an altitude sensor module, an RF transmitter module and a microcontroller/processor system. The ground based receiver/display unit comprises an RF receiver module, a microcontroller/processor system and a display system. UAV altitude sensed by the altitude sensor is transmitted to the ground unit for display in real-time. The invention facilitates the pilot's situational awareness, enhances safe operation and aids in compliance with applicable regulations.

19 Claims, 7 Drawing Sheets

(56) References Cited

U.S. PATENT DOCUMENTS

| | | | | |
|---|---|---|---|---|
| 2007/0244608 | A1* | 10/2007 | Rath | G05D 1/0038 |
| | | | | 701/3 |
| 2014/0297067 | A1* | 10/2014 | Malay | G01C 9/005 |
| | | | | 701/4 |
| 2014/0316616 | A1* | 10/2014 | Kugelmass | G05D 1/101 |
| | | | | 701/8 |
| 2015/0379874 | A1* | 12/2015 | Ubhi | G01S 5/0027 |
| | | | | 701/3 |
| 2016/0117853 | A1* | 4/2016 | Zhong | B64C 39/024 |
| | | | | 345/634 |
| 2016/0214715 | A1* | 7/2016 | Meffert | B64C 39/024 |
| 2016/0363447 | A1* | 12/2016 | Hayes | G08G 5/0013 |
| 2017/0127245 | A1 | 5/2017 | Adkins | |
| 2017/0285627 | A1* | 10/2017 | Feldmann | H04B 7/1851 |
| 2018/0046062 | A1* | 2/2018 | Fisher | G08C 17/02 |
| 2018/0173247 | A1* | 6/2018 | Ratti | B64D 47/08 |
| 2018/0218214 | A1* | 8/2018 | Pestun | G06K 9/0063 |
| 2018/0225230 | A1* | 8/2018 | Litichever | G06F 21/56 |
| 2018/0260626 | A1* | 9/2018 | Pestun | G06K 9/00637 |
| 2018/0275654 | A1* | 9/2018 | Merz | G01S 13/9303 |

OTHER PUBLICATIONS

Bluetooth Open Altimeter—Web site: http://www.bluetoothopenaltimeter.com/.
Bluetooth Open Altimeter—User's Guide.
Open Altimeter—Website (Home page) http://openaltimeter.org/index.html.
Open Altimeter—Website (Hardware page) http://openaltimeter.org/hardware.html.
Open Altimeter—Website (Instructions page) http://openaltimeter.org/instructions.html.
Spektrum SPMA9575 Aircraft Telemetry Altimeter—Web page https://www.spektrumrc.com/Products/Default.aspx?ProdID=SPMA9575.
Spektrum AR9320T Telemetry RX—Web page https://www.spektrumrc.com/Products/Default.aspx?ProdID=SPMAR9320T.
Spektrum SPMA9589 Aircraft Telemetry Variometer Sensor—Web page https://www.spektrumrc.com/Products/Default.aspx?ProdID=SPMA9589.
Public Missiles Ltd Co-pilot V3 Altimeter Web site: https://publicmissiles.com/product/electronics Manual: https://publicmissiles.com/secure/images/CoPilot3InstructionsVer1_3.pdf.
PerfectFlite altimeters: http://www.perfectflite.com/Firefly.html FireFly: http://www.perfectflite.com/Firefly.html StratoLoggerCF: http://www.perfectflite.com/SLCF.html StratoLogger SL100: http://www.perfectflite.com/sl100.html Pnut: http://www.perfectflite.com/pnut.html.
Marsa Systems Marsa54 http://www.marsasystems.com/index.php/products/marsa54lhd.
Missile Works RRC3 http://www.missileworks.com/rrc3/ User manual http://www.missileworks.com/app/download/965482691/RRC3+User+Manual+v1.60.pdf.
Eagle Tree Systems, LLC—Altimeter MicroSensor V4 Company product web site: http://www.eagletreesystems.com/index.php?route=product/product&path=64&product_id=60 Product manual: http://www.eagletreesystems.com/Manuals/altimeter-v4.pdf.
Parrot—Navigation board https://www.dollarhobbyz.com/products/parrot-ar-drone-2-0-quadcopter-navigation-board?variant=10907414401&gclid=COO7s_e2mNMCFdK6wAodZ0QKVw.
Hobby King Altimeter Bluetooth Adapter Company web site: https://hobbyking.com/en_us/hobbykingr-tm-altimeter-bluetooth-adapter-for-wireless-android-app.html?_store=en_us Manual site: https://hobbyking.com/media/file/720875413X365809X2.pdf.
Jolly Logic products—Altimeter one, Altimeter two, Altimeter three Company site: https://www.jollylogic.com/ Altimeter One site: https://www.jollylogic.com/products/altimeterone/ Altimeter Two site: https://www.jollylogic.com/products/altimetertwo/ Altimeter Three site: https://www.jollylogic.com/products/altimeterthree/.
Leddar Tech product—Leddar One (optical IR sensor) Company site: http://leddartech.com/ Product site: http://leddartech.com/modules/leddarone/.
Estes—Model Rocket Altimeter Company site:http://www.estesrockets.com/ Product site: http://www.estesrockets.com/rockets/accessories/002246-estesr-altimeter.
Hobbyist altimeter: http://hackaday.com/2014/06/20/the-ultimate-tiny-altimeter/?utm_source=feedburner&utm_medium=feed&utm_campaign=Feed%3A+hackaday%2FLgoM+%28Hack+a+Day%29.
DJI—Drones with integrated navigation boards & altimeter function Company site: http://www.dji.com/ Product manual: https://dl.djicdn.com/downloads/phantom_4/20170327/Phantom+4+User+Manual+v1.4.pdf.

\* cited by examiner

STAND-ALONE REMOTE REAL-TIME ALTITUDE READOUT METHOD AND SYSTEM FOR SMALL UAVS

TECHNICAL FIELD

The subject matter of the invention relates generally to recreational UAVs and more particularly to the determination and remote real-time display of altitude for small recreational UAVs using a stand-alone altitude monitoring system.

BACKGROUND OF THE INVENTION

Unmanned Aerial Vehicles (UAVs) have been around for many years. Remotely controlled aircraft have been in use by both the military as well as civilian hobbyists for years. Many of these were of the traditional 'fixed wing' design. More recently, small rotary wing craft, particularly multi-rotor craft (e.g. 'quad copters') have become popular in part due to their ability to take off and land in a small space and their ability to hover. This latter variant of UAV is commonly referred to as 'drones' although the class known as UAV properly defines a much larger variety of vehicles.

These UAVs or drones come in a wide variety of sizes and sophistication ranging from professional and military UAVs with navigation guidance and control systems, some as sophisticated as any manned aircraft, and powered by turbine engines, to moderately sophisticated UAVs for limited commercial purposes, to small personal or recreational vehicles used primarily by hobbyists. The applicability of the present invention is to this latter category of vehicles. As applied to the present invention, the term UAV is intended to cover not only the hobbyist drones but also RC model aircraft, model rockets and even kites and balloons.

Recreational drones have captured the interest and imagination of the general public much in the same way as earlier generations were captivated by the introductions of remote controlled (RC) model aircraft and model rocketry during the space race. The speed with which these small recreational drones were introduced into the public domain exceeded the speed with which the US aviation regulators could promulgate regulations. That has begun to change and the Federal Aviation Administration (FAA) has recently issued rules governing UAV operations in the United States. Similarly the European Aviation Safety Agency (EASA) has begun issuing rules for UAV operation in Europe. It is of the utmost importance for recreational operators to follow these rules for both the safety of the public and their own wellbeing.

One of the most important factors in flying safely is the maintenance of a safe altitude. This is just as true with UAVs as it is with manned aircraft. Thus it is no surprise that one of the first regulations implemented by the FAA in connection with civil UAVs was regarding altitude.

By FAA regulation, drone operators must keep the flying vehicle less than 400 feet above ground level (AGL) (14 CFR § 107.51(b)). There is also a requirement that UAV operators (FAA § 107 refers to them as 'remote pilots') must maintain the UAV within visual line of sight (VLOS). Depending on the size of the UAV, maintaining VLOS of the UAV might be a more restrictive requirement than the AGL altitude requirement. Nonetheless, it is good situational awareness for the remote pilot to know the UAV altitude at all times. Also, there are often non-regulatory reasons why knowledge of the vehicle's current altitude is desired such as when doing photography or remote sensing operations and of course there is always just curiosity. Notwithstanding this need for constant vigilance of the UAV's altitude, there is currently a lack of availability in the market for an apparatus and method of measuring and monitoring the altitude of small UAVs.

As mentioned, professional UAVs have sophisticated navigational and guidance systems which constantly measure and report altitude to a remote pilot, sometimes thousands of miles away. Additionally, many of the larger and more expensive recreational drones have an altitude monitoring capability built in as part of the drone's overall navigation and guidance and control module. Since the sensors and other components are integral to these UAV navigation systems, these altitude monitoring systems cannot be adapted to other smaller UAVs. Furthermore, since the altitude sensor is only one component of a larger integrated navigation system, it would not be physically or functionally possible to place it on another UAV.

At the smaller end of the spectrum, UAV hand controllers (FAA term 'control station') generally do not include any altitude or other navigation monitoring function, they are strictly designed to provide flight control of the propeller motors and perhaps a small on-board camera. Nonetheless, these smaller drones are still subject to the same altitude regulations as their larger and more expensive brethren. Thus there is a need in the market to provide a real-time stand-alone apparatus and method of monitoring the altitude of these smaller UAVs.

There are some aftermarket stand-alone devices which measure altitude that are adapted to be used in smaller UAVs. However, none of these provide a real-time, remote indication of altitude. For example, prior devices had been devised which capture altitude during flight but preserve only the highest value. Furthermore, these devices do not transmit the data back to the pilot in real-time but rather require a post flight visual inspection of the sensor. Others which do record a continuous stream of attitudes do so only within the apparatus itself requiring a post flight download to view the data. Thus, a remote pilot would know that he busted altitude limits only after the UAV was on the ground. Furthermore, all of these devices utilize mean sea level (MSL) altitude instead of above ground level (AGL) altitude requiring knowledge of the operating location's MSL elevation and some calculations to determine AGL altitude. (As is well understood by those in the art above ground level (AGL) altitude refers the height above the ground over which the vehicle is currently flying, mean sea level altitude (MSL) refers to the height of the vehicle above the mean sea level of the earth. AGL altitude may be computed by subtracting the evaluation of ground level from the measured MSL vehicle altitude.) Clearly these limitations are unacceptable when it comes to regulatory compliance and safety. To maintain safe situational awareness, the UAV altitude must be known continuously and in real-time.

Thus, what is needed is a small, stand-alone altitude monitoring system which can continuously transmit a small UAV's altitude back to the remote pilot on the ground giving him/her a real-time indication of the UAVs altitude, preferably in AGL terms. The system would be comprised of two components, an airborne sensor/transmitter unit removably mounted to the UAV and a remote/real-time display unit which would be mounted to the control station or otherwise in the physical proximity of the remote pilot on the ground. The design of the system would be such that it could be easily removed and reattached to different UAVs.

In the context of this disclosure, 'real-time' shall mean that acquisition, processing, transmission, reception and display of the UAV altitude should occur with minimal perceptible delay between altitude acquisition and its display to the remote pilot. Further in the context of this disclosure, 'stand-alone' shall refer to a system which is not integrated physically or electronically into the original UAV system but rather something that is physically independent of the UAV airframe and hand controller and associated circuitry, which is capable of being operated independently of the UAV and which most likely is obtained in the aftermarket. 'Removeably attachable' shall refer to a system which may be readily attached and detached from the UAV and the hand controller. 'Remote' shall refer to the non-negligible distance physical distance between the UAV and the pilot ('remote pilot') and/or the distance between the altitude sensor/UAV and the receiver/display ('remote receiver/display').

SUMMARY OF THE INVENTION

The invention provides an airborne altitude sensing transmitter subsystem (AASTS) removably attached to a UAV and a ground based remote receiver/display subsystem (RRDS) to receive and display the broadcast UAV altitude in real-time.

In an exemplary embodiment, the airborne altitude sensing transmitter subsystem (AASTS) comprises an altitude sensing module configured to determine altitude of the UAV. The airborne altitude sensing system also comprises a first processor system coupled to the altitude sensor module and operative to 'read' the sensed altitude output by the sensor. The airborne altitude sensing system further comprises a transmitter module coupled to the first processor system such that UAV sensed altitude may be transmitted to a remote receiver. The first processor system unit may further comprise a memory for storing various initialization parameters and optionally for storing various flight parameter values. Additionally, the first processor system memory may store instructions/code executable by the first processor which when executed causes the AASTS to perform the altitude sensing and transmit functions described herein. The AASTS may also have an independent source of power to electrically power AASTS components.

As used herein, the term 'coupled' shall mean that two elements are electrically connected to each other such that they are in communication with each other in the sense that data, control signals or power is communicated between them.

In a further exemplary embodiment of the present invention, the remote receiver/display system (RRDS) for receiving and displaying the transmitted UAV altitude in real-time comprises a receiver module configured to receive the sensed altitude transmitted by the transmitter of the airborne altitude sensing unit. The remote receiver/display unit further comprises a second processor system coupled to the receiver module and configured to 'read' the altitude received from the receiver. The remote receiver/display unit also includes a display system coupled to the second processor system and adapted to display the sensed altitude. The second processor system may further comprise a memory for storing various initialization parameters and optionally for storing various flight parameter values. The second processor system unit may further comprise a memory for storing various initialization parameters and optionally for storing various flight parameter values. Additionally, the second processor system memory may store instruction code executable by the second processor, which when executed, causes the RRDS to perform the altitude receiving and display functions described herein. The RRDS would be in physical proximity to the remote pilot so that is it available at all times for visual inspection. The RRDS may also have an independent source of power to electrically power RRDS components.

In an exemplary operational scenario, the altitude sensing unit is removably attached to the UAV and the remote display is located on or near the pilot flying the UAV such that the display is in visual proximity to the pilot. The altitude sensing and remote display units are independently switched on prior to flight. The units may have initialization sequences that run automatically upon power-up. The flight of the UAV may then commence whereupon altitude data from the altitude sensing unit is periodically transmitted to the remote display unit. The transmission rate and power may be varied to accommodate a balance of operational needs and considerations such as data capture rate, range and power consumption. Upon receipt of the transmitted altitude, the altitude is displayed to the pilot by the remote display unit. The altitude sensing unit and the remote display unit may have executable instructions or software code which when executed, controls various functions of the units such as the frequency the data is transmitted, the frequency the data is read, initialization and calibration functions, error handling conditions and enforcement of various display rules. The power-on initialization sequence may also perform an AGL zero bias determination so that subsequent altitude measurements by the altitude sensor may be calibrated to show AGL altitude to the remote pilot.

These and other improvements over the prior art will be seen in the following description.

In the context of this disclosure, 'real-time' shall mean that acquisition, processing, transmission, reception and display of the UAV altitude should occur with minimal perceptible delay between altitude acquisition and its display to the remote pilot. Further in the context of this disclosure, 'stand-alone' shall refer to a system which is not integrated physically or electronically into the original UAV system but rather something that is physically independent of the UAV airframe, hand controller and associated circuitry, which is capable of being operated independently of the UAV, and which most likely is obtained in the aftermarket. 'Removeably attachable' shall refer to a system which may be readily attached and detached from the UAV. 'Remote' shall refer to the non-negligible physical distance between the UAV and the pilot ('remote pilot') and/or the distance between the altitude sensor/UAV and the receiver/display ('remote receiver/display'). As applied to the present invention, the term UAV is intended to cover not only the hobbyist drones but also RC model aircraft, model rockets and even kites.

BRIEF DESCRIPTION OF THE DRAWINGS

In FIG. 5a the display is a seven segment LED configured to be worn on the wrist and in 5b it is an LED bar graph which could replace the seven segment LED in 5a;

DETAILED DESCRIPTION

Figure 1A:
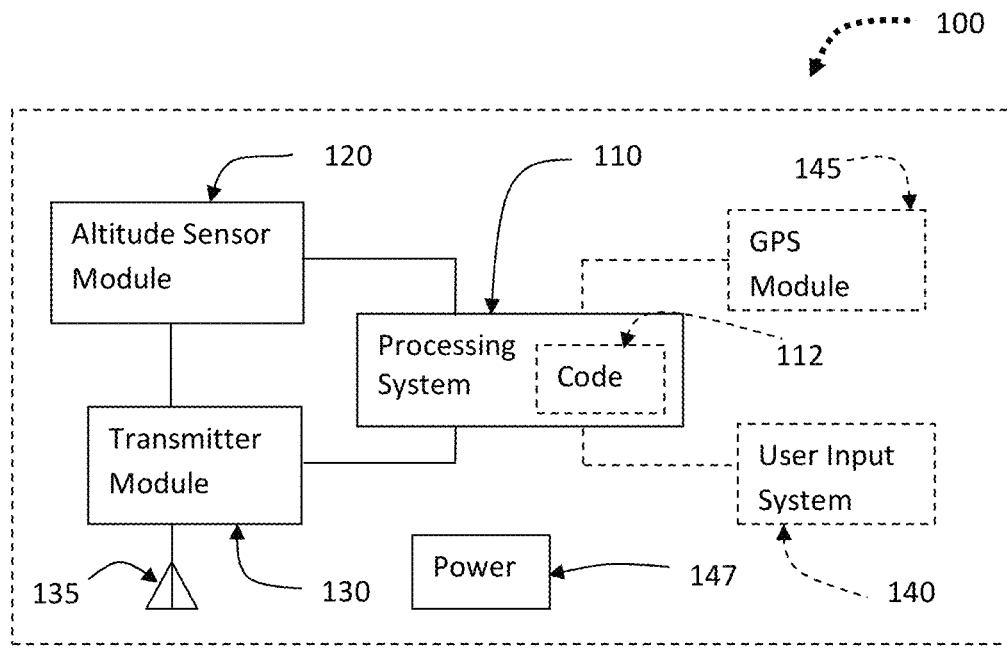
FIGS. 1a & 1b are block diagrams of exemplary embodiments of the airborne altitude sensing and transmitter system (AASTS) and the ground based remote receiver/display system (RRDS) subsystems respectively of the invention.
Figure 1B:
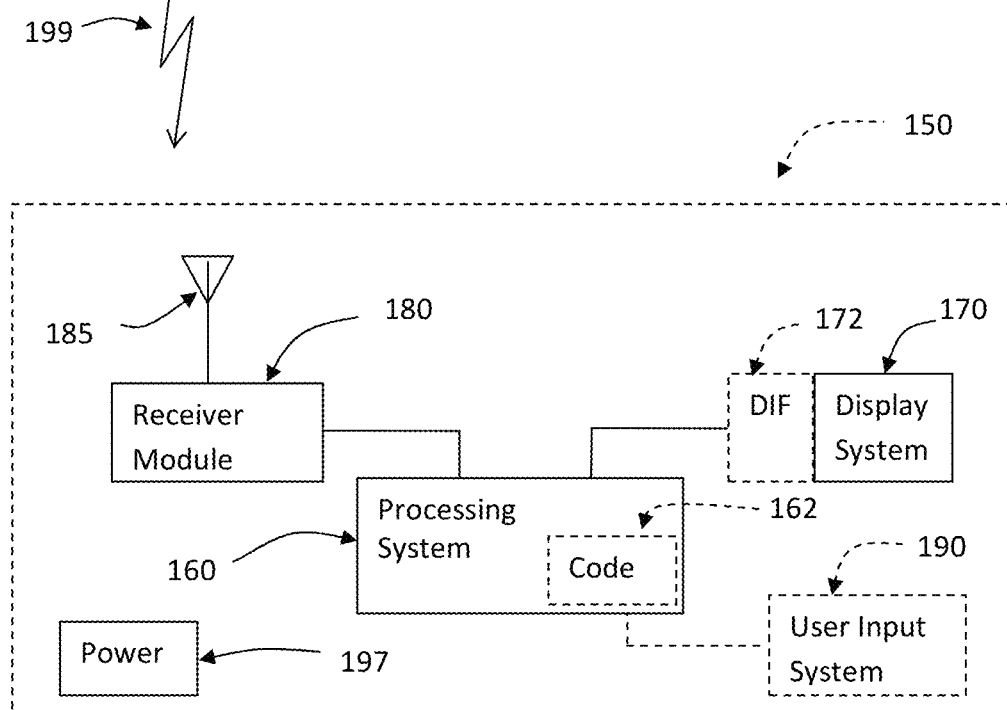

FIGS. 1a and 1b illustrate in block diagram form, an exemplary embodiment of the present invention. As seen, the invention is comprised of two major subsystems, the altitude sensing and transmitter subsystem (AASTS) 100 and the remote receiver/display subsystem (RRDS) 150.

AASTS 100 generally represents the hardware, circuitry and processing logic necessary to sense UAV altitude, process the data, and transmit the data to the RRDS ground station 150. The AASTS 100 is designed to be a stand-alone device which is not physically or electrically integrated with any of the UAV structures or components. It is designed to be removably attached to a UAV such that it is carried aloft when the UAV is launched but also able to be easily moved from one UAV to another.

The RRDS 150 is the ground based subsystem which is also designed to be a stand-alone device which is not physically or electrically integrated with the UAV hand controller and is maintained in visual proximity to the pilot so that he may maintain a close visual inspection of the UAV altitude displayed thereon. The collection, transmission, reception and display of the UAV altitude occurs in real-time using radio frequency (RF) transmission of the airborne altitude sensor data to the ground receiver display.

In an exemplary embodiment, the AASTS 100 is comprised of three major components, the processor system 110, the altitude sensor module 120 and the transmitter module 130. The processor system 110 is coupled to the altitude sensor module 120 and the transmitter module 130 allowing the processor system to periodically sample the output of the altitude sensor and communicate the sensed altitude data to the transmitter for RF transmission 199 to the RRDS ground unit 150. It should be noted that some embodiments might also include communication from the RRDS 150 to the AASTS 100 as indicated by the double arrow on 199. AASTS processor system 110 might also include instructions or code 112 for executing the features, functions and tasks of the present invention. The code 112 might be factory preloaded and/or field loadable as is well understood in the art. The AASTS 100 may also optionally comprise an operator/user interface module 140 for receiving input from the pilot concerning certain configuration parameters as discussed below. The AASTS 100 may also optionally comprise a GPS module 145 coupled to the processor system 110 for determining various flight information such as speed and location and making this data available to the processor system 110 for transmission 199 to the RRDS 150. An independent source of electrical power 147 may also be provided. Each of these AASTS components will now be discussed in more detail.

The altitude sensor module 120 represents the hardware, circuitry, and processing necessary to measure UAV altitude and interface with other system components. Numerous sensors are available for measuring altitude including but not limited to acoustic sensors, RADAR sensors, LIDAR sensors, GPS and pressure sensors. Some are direct measures of altitude while others implicitly measure altitude. Some are more accurate than others and some would be far too heavy and expensive for the intended application. In an exemplary embodiment, the altitude sensor is realized as a barometric pressure sensor for altitude determination.

Numerous commercial off-the-shelf (COTS) barometric pressure sensors are available. Barometric pressure sensors do not measure altitude directly but instead measure pressure. As well understood in the art, altitude may be computed from the pressure sensor measurement because there is a deterministic relationship between pressure and altitude. According to well know principles of physics, the relationship between measured pressure and altitude is given as:

$$h = 44,330.76\left\{1 - \left(\frac{p}{po}\right)^{.190263}\right\}$$

where:
$p_0$=sea level pressure (101,326 Pa)
p=observed pressure (Pa)
h=altitude in meters (MSL)

Several varieties of pressure sensors are available on the market. Some specific manufacturers of pressure sensors are Bosch (BMP series), TE Connectivity (MS560702 series), NXP USA (MPL series), Amphenol (NPP-301 series), Honeywell (NBPLPNN series), STMicroelectronics (LPS series), EPCOS (TDK) (B58600 series) to name but a few.

In some exemplary embodiments, altitude sensor 120 is realized with the MPL3115A2 pressure sensor. This sensor utilizes an I²C (inter-integrated circuit) interface. It also has a small physical and power footprint. It has a variety of output modes which can be selected. One of the modes provides a direct altitude (MSL) readout.

As another example, the altitude sensor 120 may be realized with the BMP 280 series pressure sensor. It utilizes either an SPI (Serial Peripheral Interface) or I²C interface and has a nominal power consumption of 2.7 µA (peak of 720 µA during a pressure measurement). A 'sleep' mode (i=0.1 µA) is provided for extremely low consumption during non-measurement cycles. It is an extremely small size and light weight make it ideal for this present use environment. It outputs measurements of temperature and pressure. There is no direct readout of altitude so this computation must be done in the processor system 110. The SPI and I²C interfaces are very common on small micro processor systems and are frequently used in System on a Chip (SOC) designs. Thus this sensor is easy to integrate with a minimum of components.

Both of these sensors have a 'sleep mode' which allows them to be put into a power conserving mode.

Numerous other sensors are commercially available and more still will be developed in the future, which would provide either a direct readout of altitude or a indication of pressure from which altitude and be computed. Many of these would be suitable for use in the present invention understanding and accounting for the interface requirements of each.

The transmitter module 130 represents the hardware, circuitry, and processing necessary to receive commands and transmit data and to interface with other system components. It receives command instructions from the processor system 110 and effectuates the transmitting the sensed altitude of the UAV from the airborne AASTS 100 to the ground based RRDS 150.

As will be appreciated by those in the art, numerous means exist for such remote transmission. Optical, acoustic, and radio frequency (RF) are examples. In an exemplary embodiment RF transmission is utilized by the transmitter module 130.

Within the RF class of transmitters, there are many families or standards of RF transmission. For example, Bluetooth, Wi-Fi, cellular, ISM, WPAN, etc. Other variables to be chosen are frequency, modulation protocol, power output, encryption etc. The transmitter module 130 may be realized as a discrete transmitter or as the transmitter portion of a transceiver module. Some manufacturers include Infineon technologies, Semtech, Microchip technologies, Melexis, RF Solutions, Maxim Integrated and HOPERF to name just a few.

There is a near limitless number of transmission frequencies. Certain RF classes will have frequencies assigned but other are more freeform. Some frequency and power outputs would require a license for legal operation. Of interest in the present invention is the fact that the FCC and other international communications authorities have cleared certain small frequency bands for use by hobbyists and others without a license. One such band is the so called Industry, Scientific, and Medical (ISM) band. The ISM band comprises the frequency range of 915 MHz in the US and 415 MHz in Europe. Other suitable frequency bands are the Wi-Fi bands and Bluetooth.

With respect to transmit power, since the use case of the present invention is primarily recreational UAVs, such operations are currently limited by both the FAA (US) and the EASA to visual line of sight (VLOS) below 400 ft AGL which limits the distance the UAV can get from the pilot. Additionally since the operations are to be conducted while maintaining visual sight of the UAV, there should be no obstructions interfering with RF transmissions. Thus required range and thus transmit power requirements are minimal.

In some exemplary embodiments, the RF transmitter module 130 may be realized with the HOPERF RF transceiver module (RFM69) capable of operating in the ISM frequency band The transmitter power is configurable and thus can be tailored to a particular use case. Since the electrical power consumption follows the transmit power, this allows an engineer to achieve an optimal balance between transmit power and electrical power consumption for a given use. Electrical power consumption during transmit is 16-130 mA depending on how the transmit output power is set. The HOPERF design allows for encryption of transmission so that several UAV altitude sensor transmitters could be operating in the same geographical area without interfering with each other. It also allows a variety of modulation modes providing additional flexibility. Finally, the RFM69 operates with the common SPI interface making it compatible with a large number of processing systems 110.

In another exemplary embodiment, the transmitter module 130 may be realized as the RF link transmitter/receiver by Wenshing. The modulation mode is ASK and the transmit power is fixed at 14 dBm. Current consumption is 8 mA. The interface to the module is serial.

In still another embodiment, the RFM75 transceiver from RF Solutions is used. The RFM75 has an output power of 4 dBm with a transmit current consumption of 18 mA. It utilizes the SPI interface. Numerous other RF transmitters/transceivers are available which could be used.

Use of a transceiver as the realization of the transmitter module 130 (and the receiver module 180) allows commands and/or data to be transmitted from the ground unit 150 to the airborne unit 100 as well. This would permit the transmission of control and configuration parameters after the flight has begun, as well as data.

Regardless of the transmitter module realization, transmission will generally require an antenna for transmission. In FIG. 1a it is seen that the transmission module 130 is connected to an antenna 135 for broadcast of the altitude to the ground unit 150. In one exemplary embodiment, this is a simple ¼ wave wire which can be placed anywhere so as not to interfere with flight operations. In other embodiments, the antenna may comprise traces on a printed circuit board (PCB).

The processor system 110 generally represents the hardware, circuitry, and processing logic necessary to execute instructions, process data and interface with the other components of AASTS 100 such as the altitude sensor module 120, the transmitter module 130, the optional user input interface module 140 and the optional GPS module 145. It controls the reading of the altitude sensor 120, processing of data and transmitting the sensed altitude of the UAV from the airborne AASTS 100 to the ground based RRDS 150.

As will be appreciated by those skilled in the art, the processor system 110 may be any of a number of devices capable of performing such functions, some examples being microprocessors, microcontrollers, Application Specific Integrated Circuits (ASIC), Programmable Logic Array (PLA), Field Programmable Gate Array (FPGA), Processor System on a Chip (PSoC) systems, etc. Major manufacturers include Cypress (MB95x, CY8C), Intel (NG80x), Motorola, Zilog (Z8x), Texas Instruments (AM335x), Atmel/Microchip Technology (ATMega, ATTINY), STMicroelectronics (STM8S) etc.

Connections between the processor system 110 and the altitude sensor system 120 and between the processor system 110 and the transmitter module 130 will be dictated by the interface protocol of the peripheral device. As mentioned above in connection with some exemplary sensor realizations, interface may take on a variety of configurations. Serial, I2C and SPI are common examples. Thus it is necessary for the processor system 110 to accommodate the chosen interface either directly or through interface conversion circuitry.

Figure 2A:
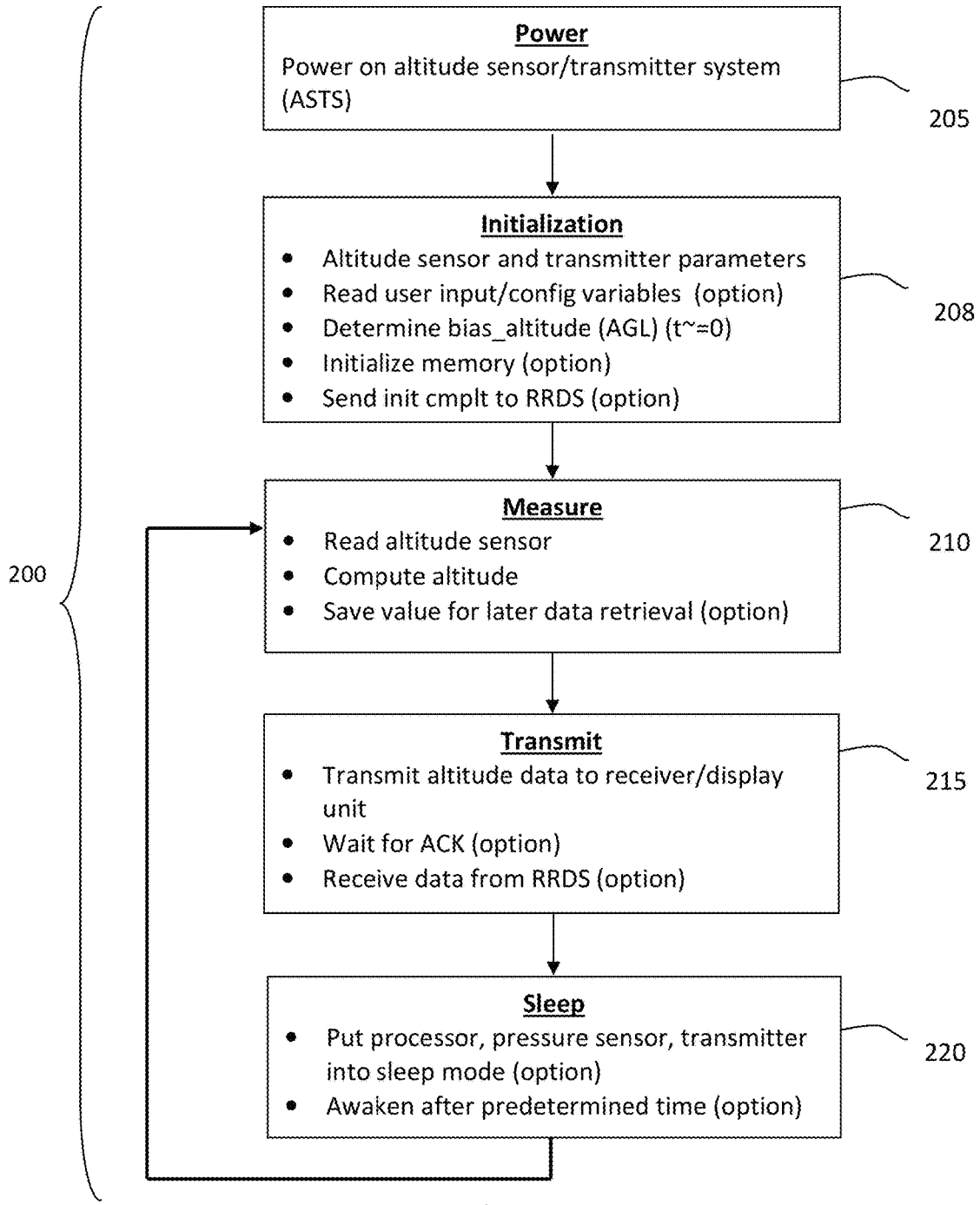
FIGS. 2a & 2b are flow diagrams of an exemplary UAV altitude acquisition, processing, transmission process, and the reception and display processes performed by the AASTS and RRDS subsystems respectively.

In an exemplary embodiment, the processor system 110 is realized as a microcontroller having a memory into which may be loaded instructions 112 which will cause the processes 200 in FIG. 2a to be executed when power is applied to the AASTS 100. These instructions will among other things control the initialization sequence, altitude data collection & processing and transmission of altitude data. The specifics of these functions are described in more detail below in connection with FIG. 2a.

As mentioned, the processor system 110 periodically samples the altitude data output from the altitude sensor 120. The rate at which the processor samples the altitude sensor 120 data may be determined by software code 112 running on the processor 110. Details are discussed in the section below.

In one exemplary embodiment, the processor system 110 is realized as the Atmel ATmega328 processor. This is an 8 bit microcontroller with 32K flash, 2K SRAM and 1K EEPROM and operates at 8 MHz with 3.3v. The processor is capable of both SPI and I²C interfaces simultaneously.

In some embodiments, the AASTS 100 may also include a user input interface module 140 coupled to processing module 110. The operator/user interface module 140 would be a means of setting configuration variables that could be read by the processing system 110 which could have the effect of altering the process 200 (FIG. 2a). As one example, a data sampling rate input could be provided for setting 'fast' or 'slow' capture rates. The 'slow' rate corresponding to one rate and 'fast' corresponding to something faster. Such a setting would tailor the data capture for different environments such as a quad copter drone or RC model airplane verses a model rocket where the data capture rate would need to be much higher due to the much greater rate of change in altitude. Another example might be an integration constant filter setting input. As an example, settings of 'hard' or 'soft' might be available allowing the operator/user to choose between longer data integration times or shorter times resulting in more or less smoothing of the altitude variations. A still further example might be an altitude units configuration allowing the altitude data to be given in units of MSL or AGL. A still further example might be the selection of transmit power. The user input interface 140 may also comprise a power switch controlling application of electrical power to the unit 100. It is also contemplated that each of these configuration parameters would have a default value 'hard coded' into the instruction set 112 such that no user input is required.

In some embodiments an optional GPS module 145 would provide various navigation data to the processing system 110. Example data might be position, speed, altitude and the like. The GPS would be coupled to the processing system 110 such that GPS data could be made available to the transmitter module 130 for transmission to the RRDS ground station 150.

The AASTS may also include a power module 147 electrically connected to the modules requiring power. Choices for the power source include various batteries such as coin cell batteries, LiPo batteries and the like.

As noted, some components may have a 'sleep mode' whereby the unit may be temporarily put to sleep for a period of time to conserve power and then reawakened later to resume normal functioning.

Turning now to FIG. 1*b*, the RRDS 150 is comprised of three major components, the receiver module 180, the display module 170 and the processor system 160. The RRDS 150 may also optionally comprise a user input interface module 190. The RRDS 150 generally represents the hardware, circuitry and processing logic necessary to receive the UAV altitude data transmitted by the AASTS 100 and display the altitude to the remote pilot.

The receiver module 180 may be realized either as a discrete receiver or as the receiver portion of a transceiver. Some manufacturers include Infineon technologies, Semtech, Microchip technologies, Melexis, RF Solutions, Maxim Integrated to name just a few. As will be understood by those in the art, the parameters discussed above in connection with the transmitter module are generally applicable to the receiver module 180 as well. As will also be understood, the selections of frequency, modulation, encryption and the like made for the transmitter 130 will have a similar complimentary setting in the receiver 180 to ensure compatibility between transmission and reception of altitude data. The receiver 180 may also comprise an antenna 185 facilitating the reception of RF transmissions from transmitter 130 and in some embodiments, transmitting data back to the airborne unit 100 transmitter 130. In some embodiments, the antenna could be a simple ¼ wave wire and in others may be a trace on a printed circuit board (PCB).

The RRDS processing system 160 generally represents the hardware, circuitry and processing logic necessary to execute instructions, process data and interface with the other components such as the receiver module 180, the display module 170, and the optional user input interface module 190. It controls the reading of the transmitted altitude data received by receiver module 180, processing of data and sending the data to the display module 170 for display to the pilot.

As will be appreciated by those skilled in the art, the processor system 160 may be any of a number of devices capable of performing such functions, some examples being microprocessors, microcontrollers, Application Specific Integrated Circuit (ASIC), Programmable Logic Array (PLA), Field Programmable Gate Array (FPGA), Processor System on a Chip (PSoC) systems, etc. Major manufacturers include Cypress (MB95x, CY8C), Intel (NG80x), Motorola, Zilog (Z8x), Texas Instruments (AM335x), Atmel/Microchip Technology (ATMega, ATTINY), STMicroelectronics (STM8S) etc.

Figure 2B:
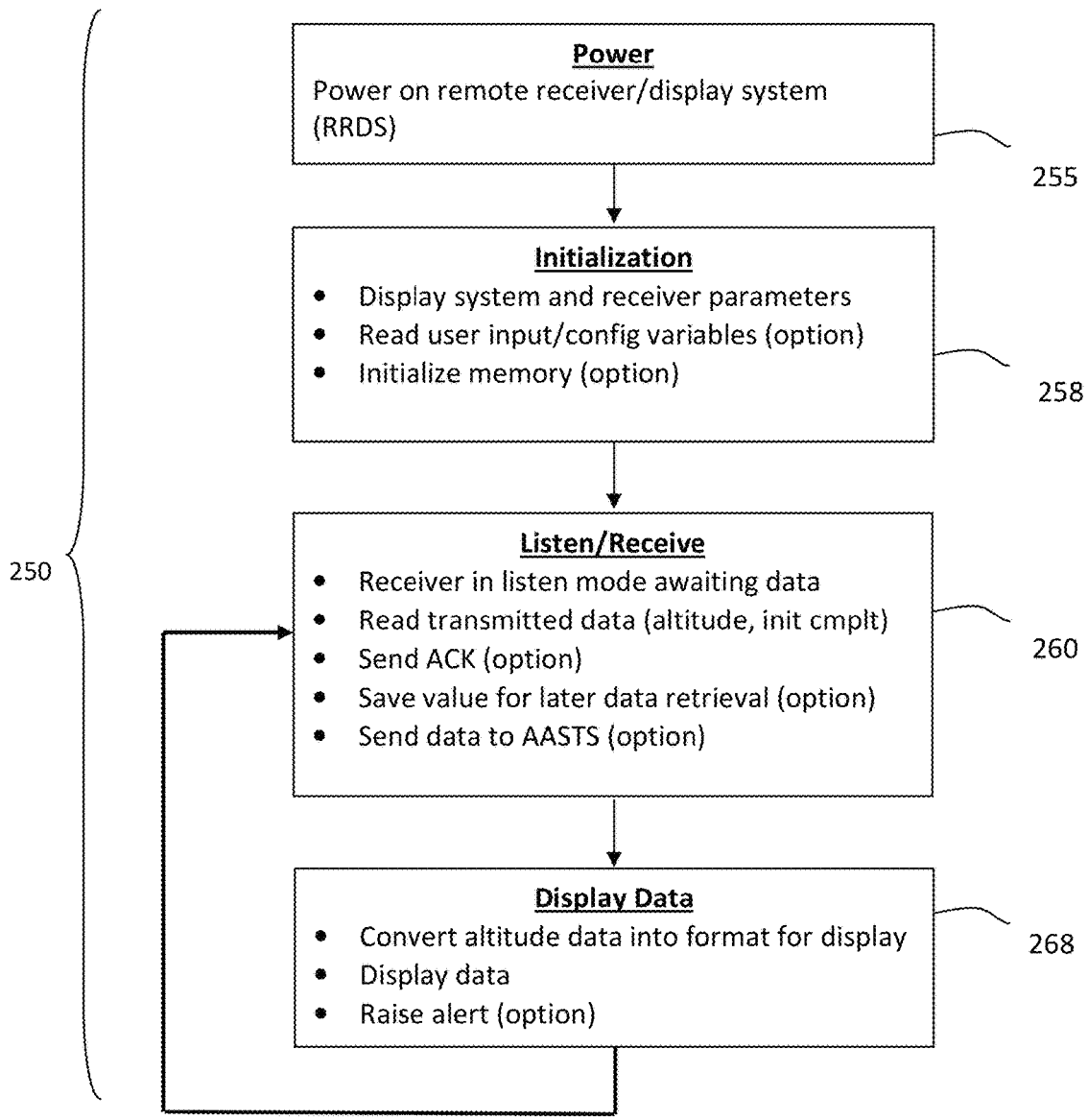

In an exemplary embodiment, the processor system 160 is realized as a microcontroller having a memory into which may be loaded software code or instructions 162 which will cause the processes 250 in FIG. 2*b* to be executed. These instructions/code 162 may among other things control the initialization sequence, altitude data reception, processing and display. The code 162 might be factory preloaded and/or field loadable as is well understood in the art. The specifics of these functions are described in more detail below in connection with FIG. 2*b*.

As mentioned, the processor 160 periodically samples the altitude data output from the receiver module 180. The received UAV altitude is then processed and sent to the display module 170 for display to the remote pilot. Details of the process are discussed in connection with FIG. 2*b*.

In some exemplary embodiments, processing systems 110 and 160 are realized as microcontrollers each having a memory for storing machine readable instructional code 112 and 162 respectively. In operation, the instructions 112 and 162 are executed automatically when the microprocessors are powered on. Instruction code 112 is associated with process 200 (FIG. 2*a*) and instruction code 162 is associated with process 250 (FIG. 2*b*). Thus, execution of instructions 112 and 162 causes process steps 200 and 250 respectively to be performed.

In one exemplary embodiment, the processor system 160 is realized as the Atmel ATmega328 processor. It should be noted there is no requirement for the AASTS processing system 110 and the RRDS processing system 160 to have the same realization.

The display module 170 generally represents the hardware, circuitry and processing logic necessary to execute process instructions and interface with the other components such as displaying the UAV altitude received by the receiver module 180 and processed by processing system 160 to the remote pilot.

The display 170 can take on numerous forms. In one example, the display can be a simple 3 or 4 digit 7 segment LED or LCD display that displays the numerical value of the data received. A 4$^{th}$ digit display provides the ability to display the negative ('-') sign in those cases where the UAV is flown below the starting altitude, e.g. off the face of a cliff or building etc. A 4$^{th}$ digit display also allows for display of 4 digit MSL altitude displays, if that option is chosen. Displays more complex and simpler may also be employed.

Figure 6:
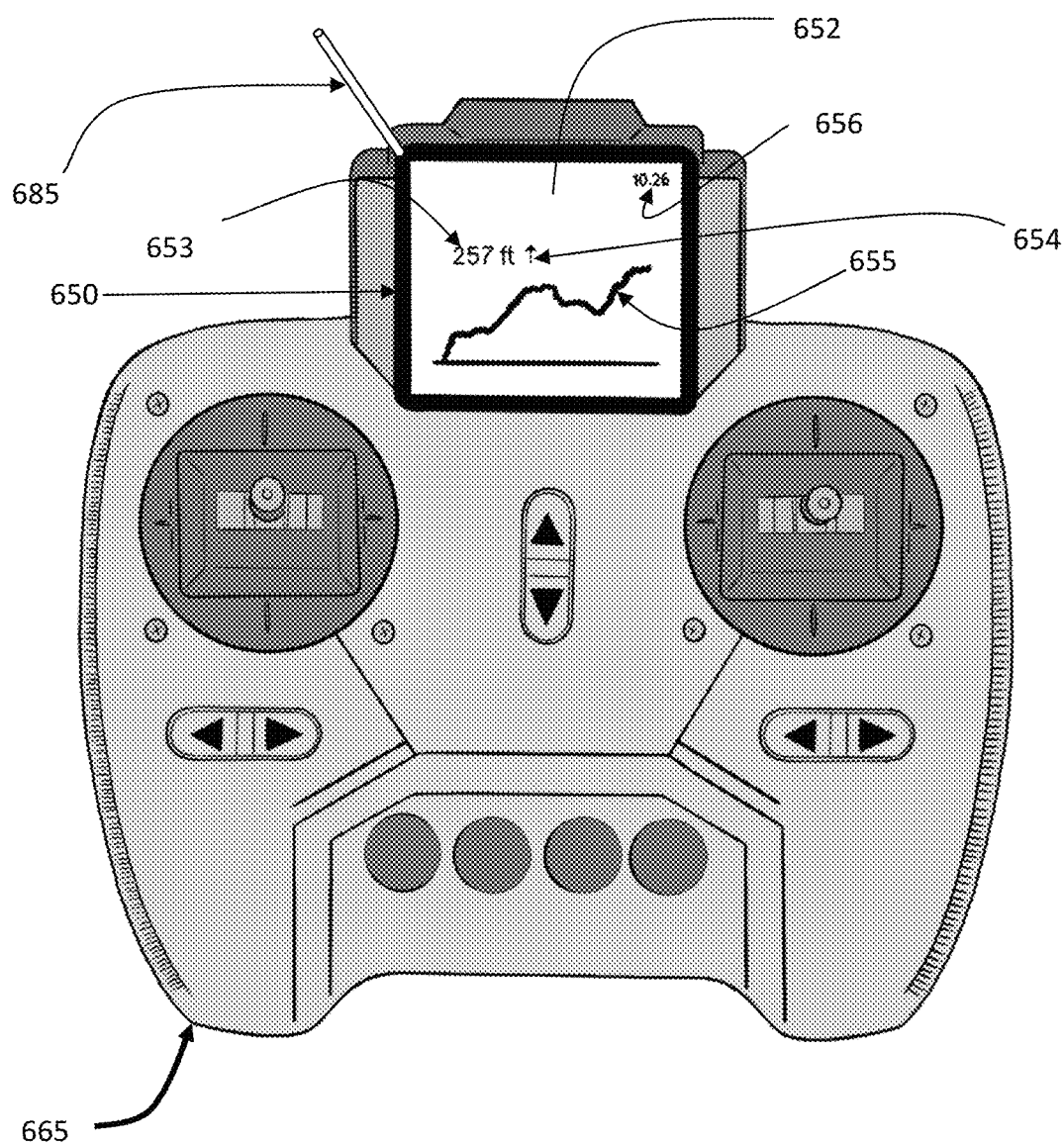
FIG. 6 illustrates an exemplary embodiment where the stand-alone remote receiver/display unit is configured to be removably attached to the UAV ground control station.

As an example of a more complex display, a graphical LCD interface may be provided as shown in FIG. 6. In addition to displaying the current altitude, a graphical representation of altitude v. time since the beginning of the flight might be shown as well as an altitude trend vector and a flight time readout. This exemplary embodiment is discussed more below in conjunction with FIG. 6.

As an alternative to the numerical displays and graphical displays mentioned above, the present invention also contemplates using a simpler display such as a bar display of LEDs (FIG. 5b) or a plurality of individual LEDs arraigned in order to provide a pictorial display of altitude rather than an explicit numerical readout. As an example, there might be eight discrete LEDs arranged sequentially in a line (5053a-h), each LED representing an altitude increment, e.g. 50 feet, for displaying the range of 0-400 feet. In that example, four LEDs illuminated (5053a-d) would mean 200 foot altitude. Other examples might be a radial dial readout or an app on a phone which would be connected either to the output of the RRDS 150 for display of the altitude data or if a compatible transmitter 130 is used, such as Wi-Fi, Bluetooth or the like, the phone could directly receive and display the data broadcast by the AASTS 100.

Whatever its form, the display module 170 would be coupled to the processing system 160 which communicates the received altitude to the display module 170. Depending on the display type selected, the display module might also comprise a display interface 172. The purpose of the display interface 172 might be to convert data format output from the processing system 160 into a format usable by the display 170. As an example, the processing system 160 might output data to the display module 170 in a serial format. The display interface 172 might then employ shift registers or the like to illuminate individual segments in a 7 segment LED display corresponding to the altitude value.

The RRDS 150 may also include a user input interface module 190 electrically coupled to processing system 160. The user input interface module may be a means of setting configuration variables that could be read by the processing system 160 which could have the effect of altering the process 250 (FIG. 2b). As one example, a configuration parameter might energize an audio output. Such an output might be responsive to certain altitude values such as exceeding a predetermined value. Another example might be a configuration parameter activating an altitude alerting feature such as upon reaching the max legal limit (400 AGL) the display flashes, blanks or otherwise alerts the pilot that the limit has been reached. It is also contemplated that each of these configuration parameters would have a default value 'hard coded' into the instruction set 162 such that no user input is required.

The operator/user interface 190 may also comprise a power switch controlling application of electrical power to the unit 150.

A power module 197 may be electrically connected to the modules requiring power. Choices for the power source include various batteries such as coin cell batteries, LiPo batteries and the like.

An alternative possibility, depending on the UAVs power source, may be to power the RRDS 150 from the ground station supply.

Some RRDS 150 components may have a 'sleep mode' whereby the unit may be temporarily put to sleep for a period of time to conserve power and then reawaken later to resume normal functioning.

Referring now to FIGS. 2a and b the AASTS 100 is configured to perform the tasks of altitude acquisition and transmission 200 and the RRDS 150 is configured to perform the tasks of altitude reception and display process 250. The tasks and processes depicted in the flow diagram 200 and 250 may be accomplished by different elements of the AASTS 100 and RRDS 150 and may be is executed in hardware, firmware or software.

For illustrative purposes only, functions, tasks or processes described in FIG. 2a or 2b may refer to elements of FIGS. 1a and 1b. For example, machine instructions or code 112 and 162 may be loaded into processing systems 110 and 160 respectively to perform tasks 200 and 250 respectively, illustrated in FIGS. 2a and 2b.

It should be apparent that the steps, tasks and functions described below may be performed by software, hardware or firmware. It should also be apparent that additional or alternative steps relative to those described below may also be performed. Also steps may be reordered from what is shown.

What follows is a description of one embodiment wherein the process steps are executed according to instruction code stored in processing system memory and are executed at run-time. Where helpful, reference numbers of elements in FIG. 1a or 1b corresponding to functions or tasks in FIG. 2a or 2b will be referenced as one exemplary embodiment of the process implementation.

Referring to FIG. 2a, and with continued reference to FIG. 1a, power application 205 begins the instruction sequence. Upon power application, the software code or instruction set 112 executes an initialization procedure 208. The initialization procedure may include reading of operator/user configuration selections set by the user input interface 140 of the AASTS 100. If the configuration selection includes choice of a data collection rate, this selection is saved into processor memory. If the configuration selection includes the choice of integration constant, the integration constant value will be saved into processor memory. If the configuration selection includes the choice of transmit power, the transmit power value will be saved into processor memory. As mentioned, it is also contemplated that each of these configuration parameters would have a default value 'hard coded' into the instruction set 112 such that no user input is required.

The selections may also include a designation of whether MSL or AGL altitude is to be transmitted 199 to the ground unit 150. The initialization process may include taking an initial altitude reading at power-on (t≈0) and saving the value as the AGL_zero_bias_altitude for use in converting the sensed MSL altitude to AGL altitude. ('t' at bias altitude capture will not strictly be zero since a finite time is required to perform the initialization process after power-on, thus it will be represented in the specification as t≈0) Thus AGL_zero_bias_altitude is the pressure altitude reading at or near ground level (i.e. zero AGL) and correcting future (t>0) pressure altitude readings by subtracting this bias will give a resulting AGL altitude. Stated mathematically, $$AGL\_zero\_bias\_altitude = pressure\ altitude_{t\approx 0}$$

$$AGL\_altitude = pressure\_altitude_{t>0} - AGL\_zero\_bias\_altitude$$

As mentioned, the flight altitude limit imposed by the FAA is an AGL altitude. Similarly, for applications where height is needed for calculations of remote sensing applications (such as scaling for photographs etc) it is important to have an accurate AGL altitude. However, most altitude sensors compute MSL altitude. The present invention teaches a simple but novel approach to solving this problem.

Figure 4:
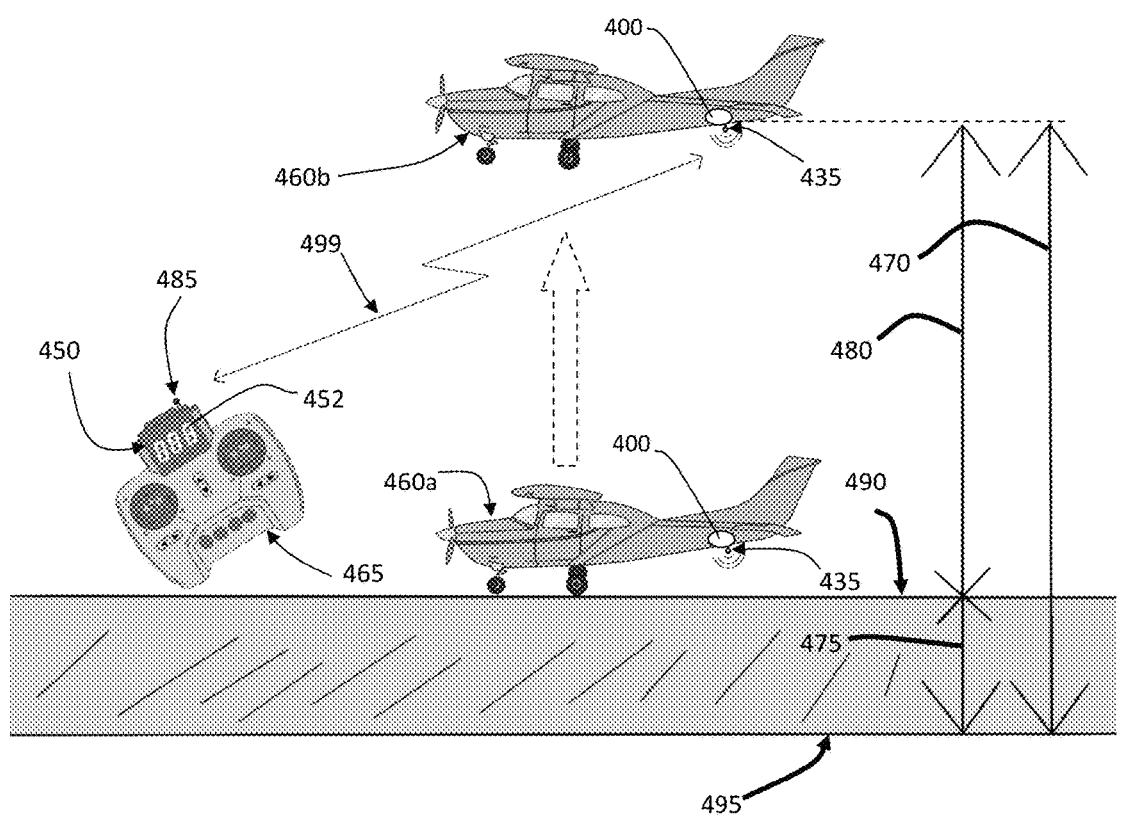
FIG. 4 is an illustration of an exemplary embodiment of the present invention showing the operational environment of the apparatus and process of remotely sensing and displaying UAV altitude.

As part of the start-up initialization sequence 208, the AASTS 100 makes an initial measurement of altitude when the unit is first powered on. This altitude is saved in memory as the AGL_zero_bias_altitude. Since power is first applied to the AASTS 100 when it is on or near the ground (@t≈0), this initial measurement is a measurement of the MSL altitude of the ground. Thus, the result of subsequent subtractions of the bias altitude is to remove this 'zero bias' from subsequent MSL measurements (t>0) resulting in an AGL altitude. While this initialization step is shown as accomplished in the AASTS 100, it could also be done in the RRDS 150. A pictorial representation of these steps and the different altitude quantities is shown in FIG. 4. Note that this initialization of the AASTS 100 may occur before or after it is attached to the UAV.

As part of the initialization sequence 208 certain variables related to the transmitter and altitude sensor are set. In an exemplary embodiment, the network ID and the transmitter and receiver node IDs are set. Additionally depending on the transmitter selected, the transmit power may be variable in which case the transmit power is set. Additionally depending on the radio selected for the design, it may be possible to select from a set of transmit frequencies. If this is the case, the transmit frequency is set. Finally and again depending on the radio selected, the decision to use encryption and acknowledgement (ACK) during the transmit/receive sequence is designated. Each of these parameters would be set during the initialization sequence 208. Alternatively, as mentioned elsewhere, default values may also be used.

As part of the initialization sequence, the AASTS 100 may send to the RRDS 150 an indication that the initialization 208 has been completed and the RRDS 150 may optionally display some indicator of initialization completion.

Finally, as part of the initialization 208 data storage memory in processor system 110 may be cleared to make way for storage of altitude data during the flight.

It is contemplated in an exemplary embodiment that the configuration parameters may have default values. Thus, if no user input is received, or if no operator/user input module 140 is present, these default values would be used.

Once the initialization 208 is completed, altitude measurements can begin 210. At run time, a determination is made as to whether the current altitude measurement is the first (t≈0), if it is; the value is read from the altitude sensor 120 and saved into memory as the AGL_zero_bias_altitude. This value is used henceforth to compute the AGL altitude from the measured MSL altitude as discussed above.

In subsequent measurements (t>0), the altitude sensor 120 value is read as msl_pressure_altitude. The AGL altitude is a function of AGL_zero_bias_altitude and the measured pressure altitude computed from the equation:

AGL_altitude=pressure_altitude−AGL_zero_bias_altitude

Where:
AGL_zero_bias_altitude=sensor measured altitude, t≈0 (at or near ground level)
pressure altitude=sensor measured altitude, t>0
AGL altitude=computed AGL altitude.

Of course as any weather observer knows, local barometric pressure is not a constant. Changes in local pressure cause changes in apparent altitude. Sometimes changes in local pressure can be quite dramatic such as in passing storms. However, during fair weather days, that under which most UAV flying occurs, the local pressure can be considered a constant during the small duration of a recreational air vehicle flight.

Furthermore since the AGL-zero_bias_altitude is determined at each power-up, suspect values can be cured by recycling power and re-establishing the baseline value. If for any reason the pilot questions the bias value, the unit power may be recycled and a new bias computed. It is further noted that best practice would be to have the receiver powered during the transmitter initialization. This allows, among other things, for the bias value to be checked (i.e. the receiver should show~zero while the UAV is on or near the ground)

Other control factors which might be applied during the measurement phase 210 are data sample rate and integration. As discussed above, certain applications may require data acquisition at a much faster rate than others. For example, when employed in a rocket, desired data acquisition might be an order or two greater than required on an RC model aircraft. This is owing to the rate at which the data (i.e. altitude) changes in the various use cases. Another factor is the data integration constant. For example, it may be desired that the data be averaged over several data capture points to smooth out some of the 'noise' which might be present in the data. As mentioned, values for these parameters may be introduced through the operator/user interface module 140 described below and/or alternatively they can be 'hard-coded' in the operating code 112 as defaults. Altitude measurement data may be saved into memory for retrieval after the flight and used is post-flight data analysis.

Once the MSL value has been read and the AGL value computed, the data is ready to be transmitted 215 to the ground station 150. Depending on the transceiver used, the data may be sent expecting an acknowledgement (ACK) from the receiver or just sent in the blind.

As mentioned above, depending on realization, the transmitter may have one or more variables which can be set affecting its operation such as frequency, encryption IDs, modulation and the like. These would be set during the initialization process 208.

As also discussed above, the transmitter 130 may be realized as the transmitter portion of a transceiver. Thus it may also be possible for the airborne unit 100 to receive data or commands from the ground unit 150 to change configurations or the like.

The transmitter 130, altitude sensor 120 and microcontroller 110 may all have various sleep modes. Details of these functions are contained within the respective sensor datasheets. The purpose of the sleep mode is to reduce power consumption during down time. Depending on the data sample frequency, a considerable amount of the sample/transmit cycle may be spent waiting for the next sequence to start. Thus a considerable power saving can be achieved by using the sleep mode during this waiting time.

If the sleep mode is used, the modules are woken at the specified time and the measurement cycle resumes.

Referring to FIG. 2b and in continuing reference to FIG. 1b, the instruction flow of the RRDS 150 is shown. The instruction sequence begins with power application task 255. Upon power application 255, the instruction set 162 executes an initialization task 258. The initialization procedure may include reading of user input configuration selections set by the user input interface 190 of the RRDS 150. Some example selections may include an audio output control could be configured to output an audio transmission of the received altitude. If such a parameter is offered, it would be read and stored during the initialization sequence. Another example might be implementation of an altitude alerting feature such as upon reaching the max legal limit (e.g. 400 AGL) the display flashes, blanks or otherwise alerts the pilot that the limit has been reached. If the altitude alerting parameter is offered, it would be read and saved off during initialization 258.

It is contemplated in an exemplary embodiment that the configuration parameters may have default values. If no user input is received, or if no operator/user input module 190 is present, these default values would be used.

As part of the initialization task 258 certain variables related to the receiver may be set. For example, for certain receiver module 180 realizations, it might be necessary to set the network ID and the transmitter and receiver node IDs. Obviously these would need to be consistent with the transmitter values set in 208 above. Additionally the receive frequency may be set and if so, must correspond to that set in 208 above. Finally and again depending on the radio selected, the decision to use encryption and acknowledgement during the transmit/receive sequence is designated and if encryption is to be used, the encryption sequence is specified. Again consistency with 208 above is necessary for transmitted data to be received. Finally any setup and initialization of the display system 170 such as setting brightness or clearing the display, is accomplished and data storage memory may be cleared to make way for storage of altitude data during the flight.

As mentioned above, as part of the initialization sequence 208, the AASTS 100 may send to the RRDS 150 an indication that the AASTS 100 initialization has been completed and that the RRDS 150 may optionally display some indicator of AASTS 100 initialization completion.

After completing the initialization task 258, the receive task 260 begins to listen for data transmitted from the AASTS 100. The listen/receive task 260 listens on the prescribed frequency for a transmitted packet. When a packet has been received, an acknowledgment is transmitted back to the transmitter if the initialization has been so configured. Otherwise the received packet is converted by the processing system 160 or the display interface 175, into a format for the display system 170. The formatted value is then communicated to the display 170 as part of task 268. Once the display of altitude has been accomplished, the process returns to the listen/receive task 260 awaiting the arrival of another packet. It is contemplated that received altitude measurement data may be saved into memory for retrieval after the flight and used in post-flight data analysis.

An optional feature of the display task 268 is the performance of an alerting function. If this function has been enabled, an alert may be generated upon the altitude value attaining and/or exceeding some predetermined threshold. For example, if the received altitude exceeds the legal 400 AGL limit, the display 170 is 'blanked', filled with 'dashes', flashes or some other indicator.

As also discussed above, the receiver 180 may be realized as the receiver portion of a transceiver. Thus it may also be possible for the airborne unit 100 to receive data or commands from the ground unit 150 to change configurations or the like.

Figure 3:
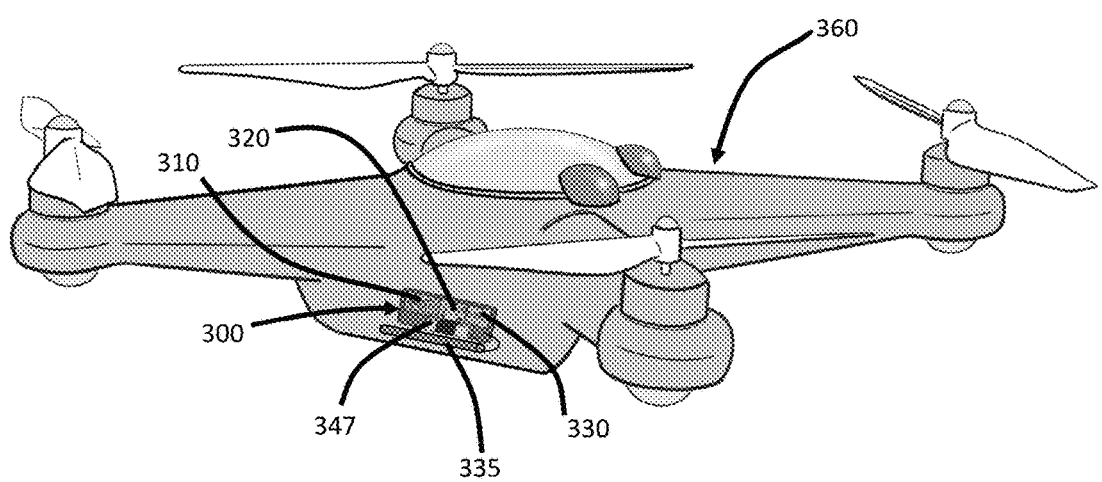
FIG. 3 illustrates an exemplary embodiment of a removable association of the stand-alone airborne altitude sensing and transmitter unit (AASTS) with a UAV.

FIG. 3 illustrates how the airborne Altitude Sensing and Transmitter System (AASTS) 300 is associated with a UAV 360. In the figure, the AASTS 300 is shown in exaggerated size relative to the UAV to illustrate the various components thereof.

In an exemplary embodiment, the AASTS 300 is removably attached, strapped or otherwise physically associated with the UAV 360 using Velcro®, straps, clips, ties, rubber bands or the like. The idea is that the AASTS 300 is small enough and light enough that it is easy to temporarily secure to the UAV and then, after a flight, can be easily removed and attached to another UAV. When the UAV 360 takes flight, the AASTS 300 is carried aloft with the vehicle. It is important that the operator of the UAV determine an attachment position on the UAV 360 such that weight & balance and flight characteristics of the UAV 360 are not substantially affected. This is facilitated by the lightweight and small size of the AASTS 300. It is important to note that the AASTS 300 is 'stand-alone.' Other than the temporary mounting of the AASTS 300 on the UAV 360, there is no physical or electrical interconnection or integration between the AASTS 300 and the UAV 360.

As seen in the figure, AASTS 300 comprises a processing system 310, an altitude sensor module 320 and the transmitter module 330. Also shown in the figure is an independent power source 347. Also illustrated is the antenna system 335 used by the transmitter module 330. The size and positioning of the antenna 335 is exaggerated in the figure to more clearly illustrate its existence. In an exemplary embodiment, the antenna is a simple wire that would be in a folded positioned along side of the AASTS 300 so as to not interfere with flight operations. In another embodiment, the antenna 335 may be realized as a trace on a printed circuit board (PCB)

Numerous methods of temporarily attaching the AASTS 300 to the UAV 360 can be imagined. Some examples are Velcro®, ties, clips and the like, the purpose being to facilitate an easy installation/removal. Other than that temporary attachment, the AASTS 300 and UAV 360 are completely separate.

FIG. 4 illustrates how the present invention would be employed in a typical use scenario. The Altitude Sensing and Transmitter System (AASTS) 400 is removably attached to a UAV 460 using Velcro®, straps, clips, ties or the like. The UAV 460 is shown in two positions 460 *a* and 460 *b* corresponding to an initial ground position and an airborne flight position respectively, illustrating the process whereby AGL altitude 480 is computed.

Referring to FIG. 4, a variety of altitudes and elevations are depicted. Sea level, ground level, and the elevation of the ground level above sea level are represented by 495, 490, and 475 respectively. Altitudes 470 and 480 both represent the altitude of the UAV. Altitude 470 represents the UAV altitude relative to sea level and 480 represents the UAV altitude relative to the ground level. Thus it is clearly seen from the figures that the altitude of the UAV above the ground 480 is represented by its altitude above sea level 470 minus the elevation of the ground 475. (i.e. in reference numeral terms, msl_altitude 470−elevation 475=agl_altitude 480)

As seen in the figure, the UAV at position 460*b* (t>0) is observed to be at an AGL altitude represented by reference 480 which also corresponds to the MSL altitude represented by arrow 470. Altitudes 480 and 470 are referenced to ground level 490 and mean sea level 495 respectively. It is readily apparent from the figure that the difference between the two is represented by reference elevation 475. Thus ground elevation 475 represents the AGL_zero_bias_altitude discussed above.

As discussed above in connection with the initialization task 208, bias_altitude 475 is determined when power is initially applied to the (AASTS) 400 when the UAV is sitting on or near the ground shown in the figure as position 460*a* (t≈0). The bias_altitude 475 is saved off in processor system memory and subsequent altitude measurements are adjusted for this value to obtain the UAV AGL altitude, e.g. 480.

The AASTS 400 transmits 215 the sensed altitude to the RRDS 450 which is removably attached to ground control station 465. Communication 499 from the airborne unit 400 to the ground unit 450 is facilitated through antennas 435 and 485 which are shown in exaggerated size and position so as to illustrate their existence. It should be noted that communication 499 is also possible from the ground unit 450 to the airborne unit 400 as discussed above and as represented by the double arrows on line 499.

RRDS 450 is shown in the figure to utilize a display system 452. In an exemplary embodiment, display system 452 is realized by a multi-digit, seven segment LED that displays the numerical altitude transmitted by (AASTS) 400 and RRDS 450. In other exemplary embodiment, the display system 450 may be realized by a graphical LCD display (FIG. 6). Additionally while in the exemplary embodiment shown in FIG. 4 the RRDS 450 is shown removably attached to ground control station 465, in other embodiments the receiver/display unit 450 and associated display system may be worn as a wrist instrument (FIG. 5a).

Figure 5A:
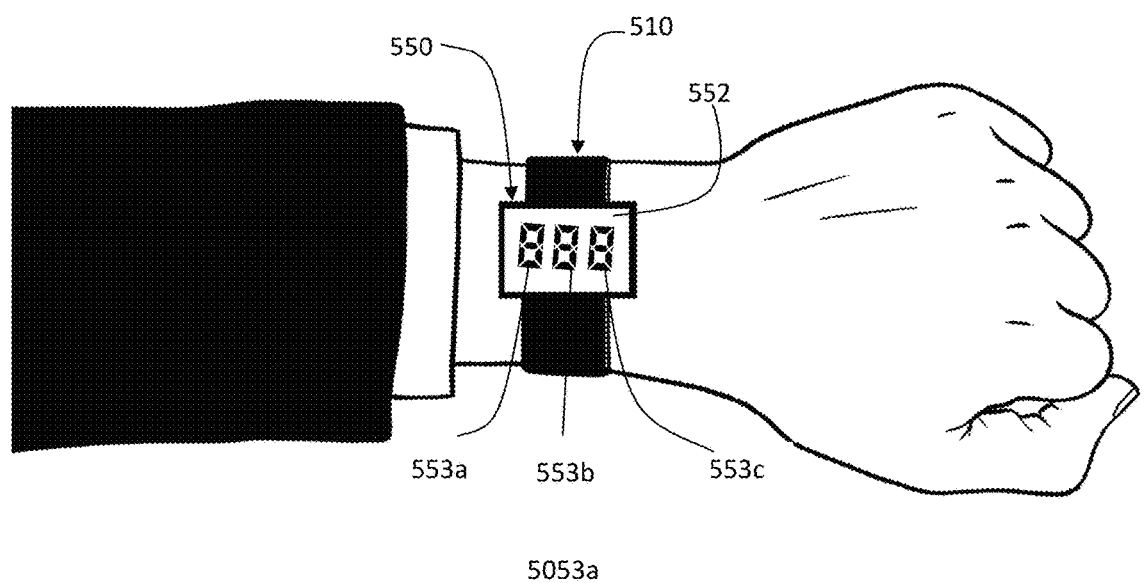
FIGS. 5a & 5b illustrates two exemplary embodiments of the stand-alone remote receiver/display unit display system.
Figure 5B:
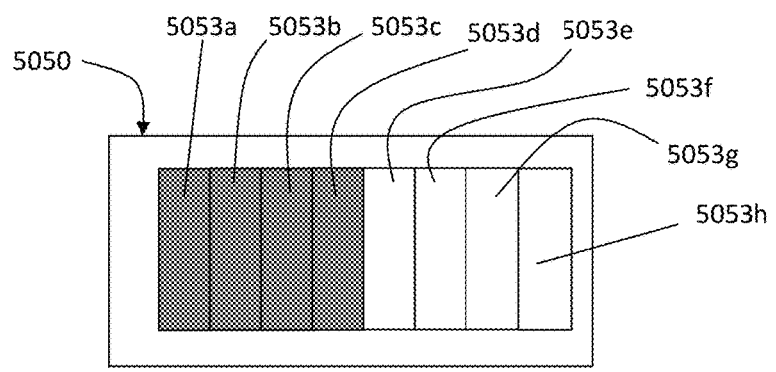

FIG. 5a shows an exemplary embodiment wherein the RRDS 550 and associated display system 552 is worn on the wrist as would be a wrist watch. In this embodiment, the RRDS 550 is secured to a wrist band 510 which is in turn removably secured to the wrist. Further in this embodiment, the display system 552 is realized as a three digit, seven segment LED display with digits 553a, 553b, 553c. The RRDS 550 and associated display system 552 are designed such that the seven segment LEDs 553a, 553b, 553c face outward as would the face of a watch. Selection of which configuration the receiver/display unit 550 and associated display system 552 is used, wrist worn or mounted on the ground control station, is strictly one of personal preference of the remote pilot. Of course there are other use scenarios such as having an assistant (FAA term is Visual Observer) hold the RRDS 550 and associated display system 552 and calling out altitudes at the remote pilot's request. The point of the invention is to provide the pilot with situational awareness as to real-time UAV altitude and whatever his preference dictates on how that information is conveyed is up to him. Note that for simplicity, the antenna is not shown but would be wrapped around the inside or outside of the RRDS 550.

FIG. 6 illustrates an alternative exemplary embodiment where the RRDS 650 is removably attached to the ground control station 665. The figure also illustrates an alternative exemplary embodiment of the display system 652. Specifically a display system 652 comprising a graphical display such as might be realized with an LCD display is shown. In addition to showing the current UAV altitude 653, a trend vector 654 may be shown. The trend vector would be an indicator of altitude changes over some past time period. A graph 655 may also be displayed showing the UAV altitude over some past period such as since the flight began. The display 652 might also display the current elapsed flight time 656. It is envisioned that other flight data might also be displayed such as battery status, MSL altitudes etc.

Communication from the airborne unit to the RRDS ground unit 650 is facilitated through antenna 685 which is shown in exaggerated size and position so as to illustrate its existence.

While a remote real-time UAV altitude readout system and process has been described with reference to various exemplary embodiments and component choices, it will be understood by those skilled in the art that various changes may be made as noted throughout the specification including substitution of various sensor components, methods for executing processor instructions and the like, including changes in function and arrangement of components or process steps without departing from the scope of the teachings herein. In addition, many modifications may be made to adapt the teachings herein to a particular situation without departing from the scope thereof. Therefore it is intended that the claims not be limited to the particular embodiments disclosed.

What is claimed is:

1. A method of sensing and remotely displaying the real-time altitude of a UAV in flight to a remote pilot on the ground using a stand-alone altitude sensing system and a stand-alone remote receiver/display system the altitude sensing system removably associated with the UAV and the remote receiver/display system positioned visually proximate to the remote pilot on the ground, the altitude sensing system having an altitude sensor, a first processor and a wireless transmitter, the remote receiver/display system having a wireless receiver, a second processor and a display, the method comprising the steps of:
   removably securing the stand-alone altitude sensing system to the UAV prior to flight the stand-alone altitude sensing system having,
      an altitude sensor for sensing UAV altitude,
      a wireless transmitter,
      a memory,
      a source of power independent of the UAV, and
      a first processor in communication with the altitude sensor, and wireless transmitter, the first processor operative to periodically obtain the sensed UAV altitude from the altitude sensor, the processor further operative to process the sensed altitude and communicate the processed UAV altitude to the wireless transmitter for wireless transmission to the remote receiver/display system, the processor having default data sample rate and integration constant configuration parameters;
   positioning the remote receiver/display system proximate to the remote pilot on the ground;
   initializing the altitude sensing system prior to flight while the UAV is on or near the ground, the initialization including at least the step of taking a initial reading of UAV altitude defined as the agl_zero_bias_altitude;
   storing the agl_zero_bias_altitude into altitude sensing system memory;
   initializing the remote receiver/display system;
   launching the UAV to create an in-flight state;
   sensing UAV altitude while the UAV is in-flight by periodically sampling the altitude sensor at a rate in accordance with the data sample rate parameter;
   processing the sensed UAV altitude with the first processor, the processing comprising at least the steps of determining the UAV agl_altitude based on the sensed altitude and the stored agl_zero_bias_altitude determined during initialization and smoothing the agl_altitude in accordance with the integration constant configuration parameter;
   transmitting with the altitude sensing system wireless transmitter, the agl_altitude in real-time, to the remote receiver/display system associated with the remote pilot on the ground, the remote receiver/display system having,
      a wireless receiver,
      a display,
      a second processor in communication with the wireless receiver and display, the second processor operative to periodically obtain the received UAV altitude from the wireless receiver, the processor further operative to communicate the received UAV altitude to the display for display in real time to the remote pilot;

receiving on the remote receiver/display system wireless receiver, the transmitted agl_altitude; and
displaying on the remote receiver/display system display, the agl_altitude in real-time.

2. The method of claim 1, wherein:
the first and second processors further comprise a first and second memory associated therewith, the first and second memory having instructions stored thereon executable by the first and second processors to perform the method of claim 1.

3. The method of claim 1, wherein:
the stand-alone altitude sensing system further includes a user input device and wherein the step of initializing the altitude sensing system prior to flight further includes:
receiving a user input from the stand-alone altitude sensing system user input device, the input reflecting at least one user input configuration parameter the user input configuration parameter overriding the default configuration parameter; and wherein
in response to the user input of at least one control parameter:
acquiring and processing the UAV altitude with the altitude sensor in accordance with the user input configuration parameter.

4. The method of claim 1, wherein the second processor of the stand-alone remote receiver/display system further includes a memory and the step of receiving the sensed UAV altitude further includes:
storing sequential agl_altitude values into the second processor memory for later retrieval and data analysis.

5. The method of claim 1, the remote receiver/display system further including a user input device, the method further comprising:
receiving a user input on the user input device including a limit value;
processing the received UAV altitude to determine whether the UAV altitude exceeds the limit value; and
displaying one or more visually distinguishable characters if the UAV altitude exceeds the limit value.

6. The method of claim 1, wherein stand-alone altitude sensing system further includes a GPS receiver and wherein the first processor is in communication with the GPS receiver, the method further including:
acquiring GPS data from the GPS receiver;
communicating the GPS data to the wireless transmitter; and
wirelessly transmitting the GPS data to the remote receiver/display system.

7. The method of claim 1, wherein the display of the remote receiver/display system comprises a smart phone and wherein the step of displaying the UAV altitude is accomplished on the smart phone.

8. The method of claim 1, wherein the stand-alone altitude sensing system wireless transmitter is a transceiver and wherein the wireless receiver of the remote receiver/display system is a transceiver, the method of claim 1 further comprising:
transmitting data from the remote receiver/display system to the altitude sensing system; and
receiving data transmitted by the remote receiver/display system on the altitude sensing system.

9. The method of claim 1, wherein the display of the remote receiver/display system is an LCD and wherein the step of displaying the UAV altitude also includes displaying a historical graph of UAV altitude, a trend vector and an indicator of flight time.

10. The method of claim 1, wherein the display of the remote receiver/display system is an LED bar display having a plurality of sequentially arraigned LEDs, and wherein the illumination of the LEDs is in proportion to the received UAV altitude.

11. The method of claim 1, wherein the display of the remote receiver/display system is a multi-digit seven segment LEDs operative to display the numerical value of the UAV altitude.

12. A stand-alone system for determining and remotely displaying the real-time altitude of a small UAV in flight to a remote pilot on the ground, the system comprising;
a stand-alone altitude sensing and transmitting system removably attached to the UAV, the stand-alone altitude and transmitting sensing system having,
an barometric pressure sensor module for sensing altitude of the UAV,
a transmitter module for wirelessly transmitting the sensed UAV altitude,
a first processor system, the first processor system coupled to and in communication with the barometric pressure sensor module and the transmitter module, the first processor system having default data sample rate and integration constant configuration parameters, the first processor system operative to continuously sample the sensed UAV altitude from the barometric pressure sensor in accordance with the default data sample rate and integration constant configuration constant parameters and communicate the sampled UAV altitude to the transmitter, the transmitter operative to continuously and wirelessly transmit in real time the sampled UAV altitude; and
a source of power independent of the UAV and in electrical contact with the barometric pressure sensor module, transmitter module and first processor system but independent of any UAV systems;
a stand-alone remote receiver/display system positioned in visual proximity to the remote pilot, the remote receiver/display system having,
a receiver module for wirelessly receiving the transmitted sampled UAV altitude,
a display system for displaying the received UAV altitude, and
a second processor system, the second processor system coupled to and in communication with the receiver module and the display system, the second processor system operative to acquire the continuously received UAV altitude, from the receiver module and communicate the received UAV altitude to the display system for real time visual display to the remote pilot.

13. The system of claim 12, wherein:
the a stand-alone altitude sensing and transmitting system removably attached to the UAV further comprises a GPS receiver in communication with the first processor, the first processor system operative to continuously obtain GPS data from the GPS receiver and communicate the GPS data to the wireless transmitter, the transmitter operative to continuously and wirelessly transmit the GPS data; and wherein
the stand-alone remote receiver/display system receiver module wirelessly receives the transmitted GPS data, the stand-alone remote receiver/display system second processor operative to obtain the received GPS data from the receiver and communicate the GPS data to the display system for visual display to the remote pilot.

14. The system of claim 12, wherein:
the first and second processors further comprise a first and second memory associated therewith, the first and second memory having instructions stored thereon executable by the first and second processors to perform the method of claim 1.

15. The system of claim 12, wherein:
the stand-alone altitude sensing system comprises a first user input system for receiving user input of first configuration parameters; and
the stand-alone remote receiver/display system comprises a second user input system for receiving user input of second configuration parameters, the first and second user input configuration parameters operative to override the default configuration parameters.

16. The system of claim 12, wherein the display system comprises a multi-digit seven segment LED display.

17. The system of claim 12, wherein the display system comprises an LCD display.

18. The system of claim 12, wherein the display system comprises an LED bar graph display.

19. The system of claim 12, wherein the stand-alone altitude sensing and transmitting system transmitter module comprises a transceiver and wherein the stand-alone remote receiver/display system receiver module comprises a transceiver such that data may be transmitted from the ground based stand-alone remote receiver/display system to the airborne stand-alone altitude sensing and transmitting system.

* * * * *